(12) United States Patent
Park

(10) Patent No.: US 9,451,112 B2
(45) Date of Patent: Sep. 20, 2016

(54) IMAGE FORMING APPARATUS AND METHOD FOR CONTROLLING THE SAME

(71) Applicant: SAMSUNG ELECTRONICS CO., LTD., Suwon-si, Gyeonggi-do (KR)

(72) Inventor: Ho-beom Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/568,679

(22) Filed: Dec. 12, 2014

(65) Prior Publication Data

US 2015/0098102 A1  Apr. 9, 2015

Related U.S. Application Data

(63) Continuation of application No. 13/355,859, filed on Jan. 23, 2012, now Pat. No. 9,015,506.

(30) Foreign Application Priority Data

May 4, 2011 (KR) ........................ 10-2011-0042618

(51) Int. Cl.
| | | |
|---|---|---|
| G06F 1/26 | (2006.01) |
| G06F 1/32 | (2006.01) |
| H04N 1/00 | (2006.01) |
| H04N 1/32 | (2006.01) |
| G06K 15/00 | (2006.01) |

(52) U.S. Cl.
CPC ...... *H04N 1/00885* (2013.01); *G06K 15/4055* (2013.01); *H04N 1/00896* (2013.01); *H04N 1/00928* (2013.01); *H04N 1/32593* (2013.01); *H04N 1/32598* (2013.01); *H04N 2201/0094* (2013.01); *Y02B 60/1267* (2013.01)

(58) Field of Classification Search
CPC ..................... H04N 1/00885; H04N 1/00896; H04N 1/00928; H04N 1/32593; H04N 1/32598; G06K 15/4055
USPC ................................................. 713/300, 320
See application file for complete search history.

(56) References Cited

U.S. PATENT DOCUMENTS

| | | |
|---|---|---|
| 7,057,754 B1 | 6/2006 | Tsuchiya et al. |
| 8,495,401 B2 | 7/2013 | Hwang |

(Continued)

FOREIGN PATENT DOCUMENTS

| | | |
|---|---|---|
| CN | 101945197 | 1/2011 |
| CN | 102025866 | 4/2011 |

(Continued)

OTHER PUBLICATIONS

PCT International Search Report filed May 4, 2012, issued in corresponding PCT Patent Application No. PCT/KR2012/003536.

(Continued)

*Primary Examiner* — Mark Connolly
(74) *Attorney, Agent, or Firm* — Staas & Halsey LLP

(57) ABSTRACT

An image forming apparatus includes an engine unit performing an image forming job; an engine controller to perform the image forming job; and a main controller controlling an operation of the engine unit by communicating with the engine controller in a normal mode and being inactivated if the image forming apparatus changes the mode to a low-power mode. The engine controller performs the image forming job by driving the engine unit in the normal mode under the control of the main controller, and provides a service that corresponds to the low-power mode if the image forming apparatus changes the mode to the low-power mode.

12 Claims, 10 Drawing Sheets

(56) References Cited

U.S. PATENT DOCUMENTS

| | | |
|---|---|---|
| 8,578,181 B2 | 11/2013 | Tanaka |
| 8,578,195 B2 | 11/2013 | Park et al. |
| 8,630,305 B2 | 1/2014 | Anderson et al. |
| 8,630,318 B2 | 1/2014 | Anderson et al. |
| 8,819,467 B2 | 8/2014 | Park et al. |
| 2005/0271072 A1 | 12/2005 | Anderson et al. |
| 2009/0287945 A1 | 11/2009 | Kim et al. |
| 2010/0128626 A1 | 5/2010 | Anderson et al. |
| 2010/0250987 A1 | 9/2010 | Furukawa |
| 2011/0004776 A1 | 1/2011 | Tanaka |
| 2011/0058214 A1 | 3/2011 | Park et al. |
| 2011/0060925 A1 | 3/2011 | Park |
| 2011/0060929 A1 | 3/2011 | Park et al. |
| 2011/0085197 A1 | 4/2011 | Kim |
| 2012/0054479 A1 | 3/2012 | Park |
| 2013/0067259 A1 | 3/2013 | Freiwald |
| 2013/0173943 A1 | 7/2013 | Park et al. |
| 2014/0019785 A1 | 1/2014 | Tanaka |

FOREIGN PATENT DOCUMENTS

| | | |
|---|---|---|
| EP | 1035499 | 9/2000 |
| EP | 2032521 | 10/2009 |
| EP | 2302520 | 3/2011 |
| EP | 2437180 | 4/2012 |
| JP | 2010-005911 | 1/2010 |
| JP | 2010-094925 | 4/2010 |
| KR | 10-2011-0027545 | 3/2011 |
| RU | 2 313 920 | 12/2007 |
| RU | 2008 139 959 | 4/2010 |
| TW | 200302960 | 8/2003 |
| TW | 200623765 | 7/2006 |
| WO | WO 03/067630 | 8/2003 |
| WO | WO 03/067730 | 8/2003 |

OTHER PUBLICATIONS

U.S. Notice of Allowance issued Sep. 9, 2014 in corresponding U.S. Appl. No. 13/355,859.

U.S. Appl. No. 13/355,859, filed Jan. 23, 2012, Ho-beom Park, Samsung Electronics Co., Ltd.

U.S. Notice of Allowance mailed on Dec. 17, 2014 in copending U.S. Appl. No. 13/355,859.

Taiwanese Office Action issued Oct. 7, 2015 in corresponding Taiwanese Patent Application No. 101113818.

Chinese Office Action issued Nov. 2, 2015 in corresponding Chinese Patent Application No. 201210135954.4.

Russian Decision on Grant dated May 5, 2016 from Russian Patent Application No. 2013153584, 20 pages.

Chinese Office Action dated Jun. 23, 2016 from Chinese Patent Application No. 201210135954.4, 25 pages.

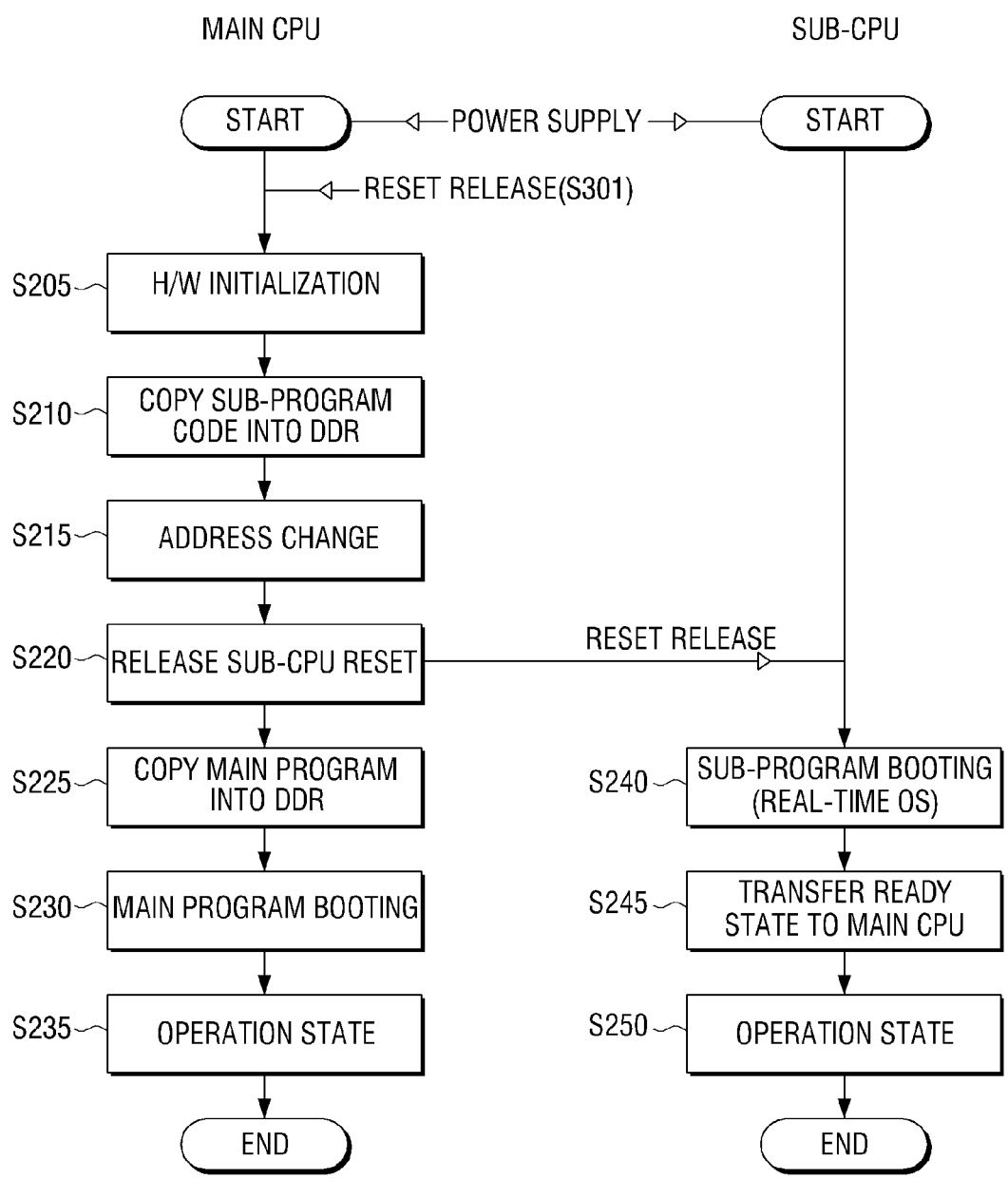

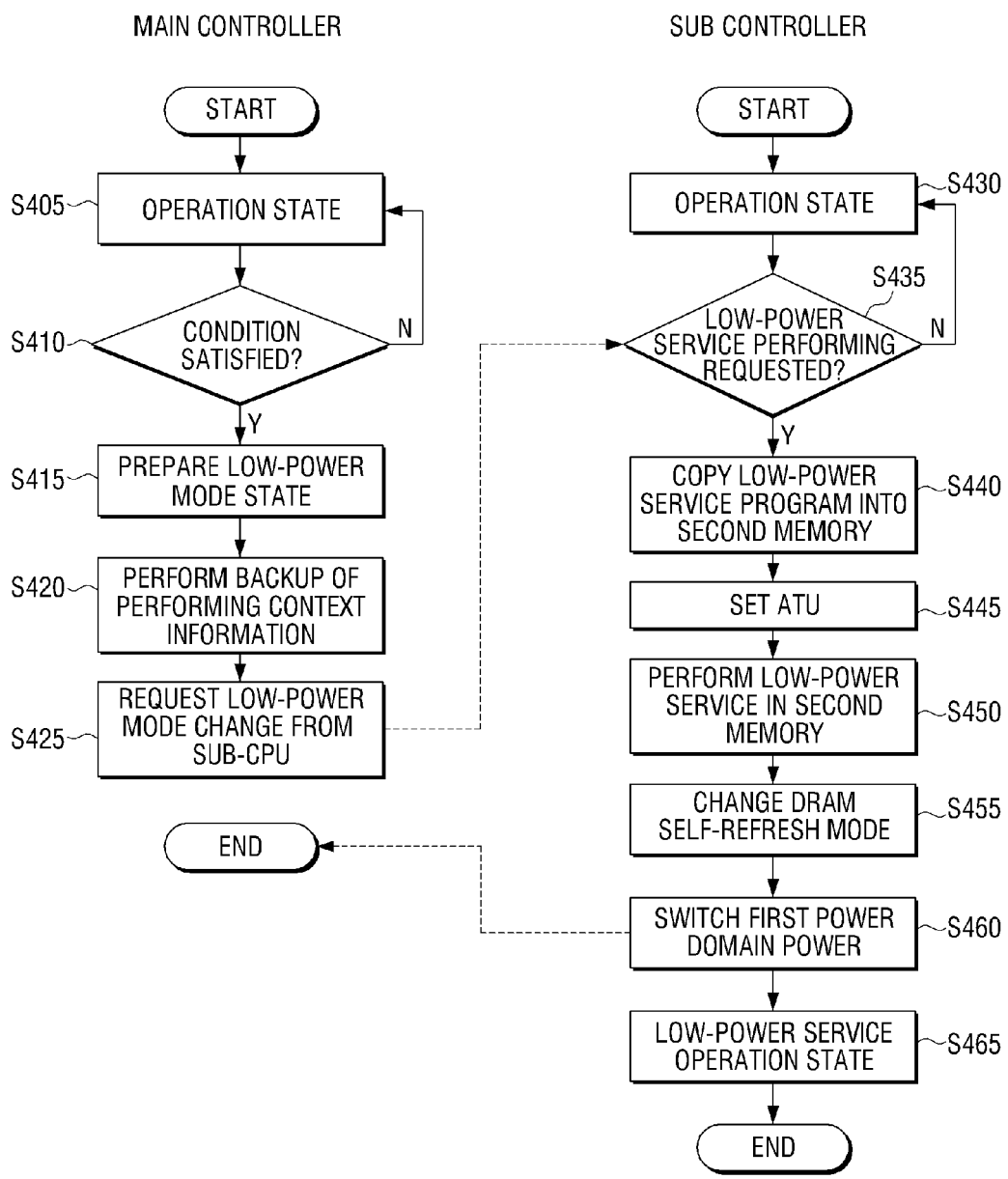

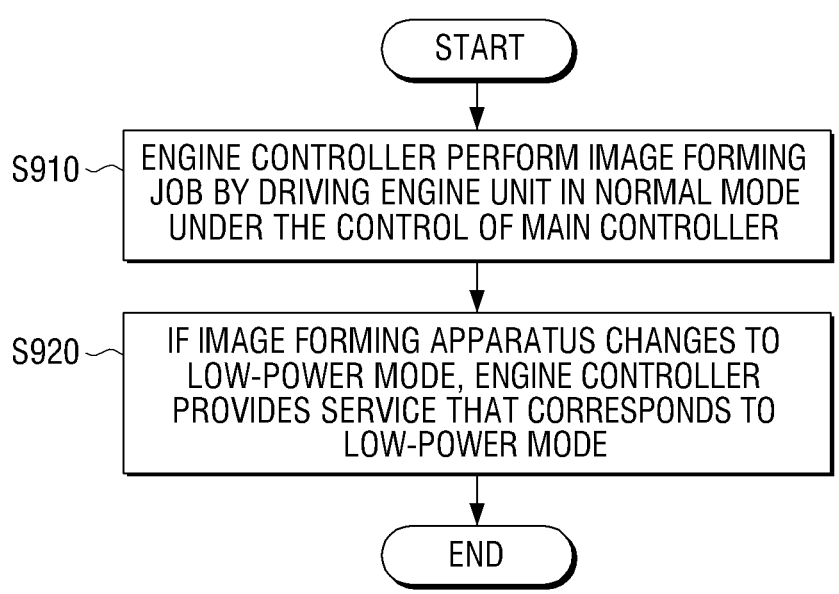

IMAGE FORMING APPARATUS AND METHOD FOR CONTROLLING THE SAME

CROSS-REFERENCE TO RELATED APPLICATIONS

This application is a divisional of U.S. application Ser. No. 13/355,859 filed on Jan. 23, 2012, which claims priority under 35 U.S.C. §119(a) to Korean Patent Application No. 10-2011-0042618, filed on May 4, 2011, in the Korean Intellectual Property Office, the disclosures of which are incorporated herein by reference.

BACKGROUND

1. Field

The present disclosure relates generally to an image forming apparatus and a method for controlling the same, and more particularly, to an image forming apparatus and a method for controlling the same, which can implement a low-power mode.

2. Description of the Related Art

Recently, a demand for low power consumption of all electronic appliances has been gradually strengthened, and the electronic appliances which do not cope with such a demand, even if they have an advantage in performance and price, cannot be sold due to the corresponding regulatory restriction.

The current specification of Energy Star requires that power consumption in a standby mode is equal to or less than 1 to 2 W according to the type of appliance. Hereafter, even in a standby state where a network service is possible, power consumption of equal to or less than 1 W will be required, and all electronic companies have mobilized various methods to comply with this requirement.

Further, it is required for a consumer not to feel inconvenience depending on whether the appliance is in a low-power state or in a normal operation state.

According to a current method that most companies approach to achieve a low-power standby mode, a high-performance main CPU and an auxiliary CPU that consumes low power are configured, and in a normal mode, a service is provided through the main CPU, while if the system enters into a standby mode in compliance with a specified condition, the main CPU and unnecessary system power are turned off and monitoring of a service request is performed through the auxiliary CPU. In this case, if a user requests a service, the auxiliary CPU applies the power to the main CPU and auxiliary circuits to provide the requested service. That is, in addition to the existing CPU cores, a separate CPU having a small gate size is to be added.

As an example, a system in the related art is provided with a sub-controller that is mounted thereon in addition to the main controller to recognize 10 reception and wakeup processing events in a low-power mode and to apply the power to the main controller. In this case, since a separate chip is mounted, the price is increased, and separate circuits and software for communication between the main controller and the sub-controller are required.

As another example, CPUs of the main controller and the sub-controller are integrated into one SoC, and in a service mode, the main controller controls MAC, USB, Fax, and 10 ports, while in a low-power mode, the sub-controller processes data such as MAC, USB, Fax, and 10 ports. Even in this case, it is necessary to add a separate CPU for low power.

SUMMARY

The present disclosure has been made to address at least the above problems and/or disadvantages and to provide at least the advantages described below. Accordingly, an aspect of the present disclosure provides an image forming apparatus and a method for controlling the same, which can implement a lower power mode without adding a separate CPU.

According to one aspect of the present disclosure, an image forming apparatus includes first and second memories; and a main controller and a sub-controller; wherein the main controller performs a control operation using the first memory in a normal mode state, the sub-controller is mounted on an engine unit provided in the image forming apparatus to perform an image forming job by driving the engine unit in a normal mode state under the control of the main controller, the main controller transmits a low-power mode change request to the sub-controller if a condition for changing the mode from the normal mode state to a low-power mode state is satisfied, and the sub-controller copies a low-power service program stored in the first memory into the second memory if the low-power mode change request is received, and performs a low-power service by executing the low-power service program through accessing of the second memory.

The image forming apparatus according to an embodiment of the present disclosure may further include an inter-controller communication unit to relay communication between the main controller and the sub-controller; and an address change unit to set a memory address to be accessed by the sub-controller in the low-power mode state; wherein the sub-controller controls the address change unit to set the memory address to be accessed in the second memory, and performs the lower-power service by executing the low-power service program through accessing of the second memory according to the set memory address.

The main controller and the sub-controller may be arranged in different power domains, and if the low-power mode is performed, the sub-controller may intercept power that is supplied to the power domain in which the main controller is arranged.

The image forming apparatus according to an embodiment of the present disclosure may further include a power supply unit to supply power to respective power domains in which the main controller and the sub-controller are arranged if the image forming apparatus is turned on; wherein if the image forming apparatus is turned on and the power is supplied, the main controller becomes in a reset release state to perform initialization, sets the access address by controlling the address change unit, transmits a reset release signal to the sub-controller, and then operates in the normal mode state by booting a main program, and the sub-controller maintains a reset state until the reset release signal is received after the image forming apparatus is turned on, and if the reset release signal is received, becomes in the reset release state to operate in the normal mode state.

According to another aspect of the present disclosure, an image forming apparatus includes first and second memories; and a main controller and a sub-controller; wherein the main controller performs a control operation using the first memory in a normal mode state, the sub-controller is mounted on an engine unit provided in the image forming apparatus to perform an image forming job by driving the engine unit in a normal mode state under the control of the main controller and to perform a low-power service in a low-power mode state, the main controller copies a low-power service program stored in the first memory into the second memory and transmits a reset signal to the sub-controller if a condition for changing the mode state from the normal mode state to a low-power mode state is satisfied, and the sub-controller performs the low-power service by executing the low-power service program through accessing of the second memory if the reset signal is received.

The image forming apparatus according to another embodiment of the present disclosure may further include an inter-controller communication unit to relay communication between the main controller and the sub-controller; and an address change unit to set a memory address to be accessed by the sub-controller in the low-power mode state; wherein the main controller controls the address change unit to set the memory address to be accessed in the second memory, and the sub-controller performs the lower-power service by executing the low-power service program through accessing of the second memory according to the set memory address if the reset signal is received.

The main controller and the sub-controller may be arranged in different power domains, and if the low-power mode is performed, the sub-controller may intercept power that is supplied to the power domain in which the main controller is arranged.

The image forming apparatus according to an embodiment of the present disclosure may further include a power supply unit to supply power to respective power domains in which the main controller and the sub-controller are arranged if the image forming apparatus is turned on; wherein if the image forming apparatus is turned on and the power is supplied, the main controller becomes in a reset release state to perform initialization, sets the access address by controlling the address change unit, transmits a reset release signal to the sub-controller, and then operates in the normal mode state by booting a main program, and the sub-controller maintains a reset state until the reset release signal is received after the image forming apparatus is turned on, and if the reset release signal is received, becomes in the reset release state to operate in the normal mode state.

According to still another aspect of the present disclosure, an image forming apparatus includes an engine unit performing an image forming job; an engine controller mounted on the engine unit to perform the image forming job; and a main controller to control an operation of the engine unit by communicating with the engine controller in a normal mode and being inactivated if the image forming apparatus changes the mode to a low-power mode; wherein the engine controller performs the image forming job by driving the engine unit in the normal mode under the control of the main controller, and provides a service that corresponds to the low-power mode if the image forming apparatus changes the mode to the low-power mode.

The image forming apparatus according to still another embodiment of the present disclosure may further include first and second memories; and an address change unit setting a memory address to be accessed by the sub-controller in the low-power mode state; wherein the sub-controller performs a control operation using the first memory in the normal mode state, and the address change unit sets the memory address to be accessed by the sub-controller in the second memory under the control of the sub-controller or the main controller.

The main controller and the sub-controller may be arranged in different power domains, and if the low-power mode is performed, the sub-controller may intercept power that is supplied to the power domain in which the main controller is arranged.

The sub-controller may perform at least one of a self-refresh mode change of the first memory, a clock speed change for the low-power mode, a network link speed change, and a hardware (H/W) setting for the low-power mode service when the mode is changed from the normal mode to the low-power mode.

According to still another aspect of the present disclosure, a method for controlling an image forming apparatus including first and second memories, a main controller performing a control operation using the first memory in a normal mode state, and a sub-controller mounted on the engine unit to perform an image forming job by driving the engine unit in the normal mode state under the control of the main controller, includes the main controller transmitting a low-power mode change request to the sub-controller if a condition for changing the mode state from the normal mode state to a low-power mode state is satisfied; the sub-controller copying a low-power service program stored in the first memory into the second memory if the low-power mode change request is received; and the sub-controller performing a low-power service by executing the low-power service program through accessing of the second memory.

In the method for controlling an image forming apparatus according to still another embodiment of the present disclosure, the image forming apparatus may further include an inter-controller communication unit relaying communication between the main controller and the sub-controller, and an address change unit setting a memory address to be accessed by the sub-controller in the low-power mode state; and the method for controlling the image forming apparatus may further include the sub-controller controlling the address change unit to set the memory address to be accessed in the second memory; wherein performing the low-power service performs the lower-power service by executing the low-power service program through accessing of the second memory according to the set memory address.

The main controller and the sub-controller may be arranged in different power domains, and the method for controlling an image forming apparatus according to still another embodiment of the present disclosure may further include the sub-controller intercepting power that is supplied to the power domain in which the main controller is arranged if the low-power mode is performed.

The method for controlling an image forming apparatus according to still another embodiment of the present disclosure may further include supplying power to respective power domains in which the main controller and the sub-controller are arranged if the image forming apparatus is turned on; if the image forming apparatus is turned on and the power is supplied, the main controller becoming in a reset release state to perform initialization, setting the access address by controlling the address change unit, transmitting a reset release signal to the sub-controller, and then operating in the normal mode state by booting a main program after transmitting the reset release signal to the sub-controller; and the sub-controller maintaining a reset state until the reset release signal is received after the image forming apparatus is turned on, and if the reset release signal is received, becoming in the reset release state to operate in the normal mode state.

According to still another aspect of the present disclosure, a method for controlling an image forming apparatus including first and second memories, a main controller performing a control operation using the first memory in a normal mode state, and a sub-controller mounted on the engine unit to perform an image forming job by driving the engine unit in the normal mode state under the control of the main controller and to perform a low-power service in a low-power mode state, includes the main controller copying a low-power service program stored in the first memory into the second memory and transmitting a reset signal to the sub-controller if a condition for changing the mode state from the normal mode state to a low-power mode state is satisfied; and the sub-controller performing the low-power service by executing the low-power service program through accessing of the second memory if the reset signal is received.

In the method for controlling an image forming apparatus according to still another embodiment of the present disclosure, the image forming apparatus may further include an inter-controller communication unit relaying communication between the main controller and the sub-controller, and an address change unit setting a memory address to be accessed by the sub-controller in the low-power mode state; and the method for controlling the image forming apparatus may further include the main controller operating to set the memory address to be accessed in the second memory; wherein the operation of performing the low-power service performs the lower-power service by executing the low-power service program through accessing of the second memory according to the set memory address.

The main controller and the sub-controller may be arranged in different power domains, and the method for controlling an image forming apparatus according to still another embodiment of the present disclosure may further include the sub-controller intercepting power that is supplied to the power domain in which the main controller is arranged if the low-power mode is performed.

In the method for controlling an image forming apparatus according to still another embodiment of the present disclosure, the image forming apparatus may further include a power supply unit supplying power to respective power domains in which the main controller and the sub-controller are arranged if the image forming apparatus is turned on; and the method for controlling the image forming apparatus may further include if the image forming apparatus is turned on and the power is supplied, the main controller becoming in a reset release state to perform initialization, setting the access address by controlling the address change unit, transmitting a reset release signal to the sub-controller, and then operating in the normal mode state by booting a main program after transmitting the reset release signal to the sub-controller; and the sub-controller maintaining a reset state until the reset release signal is received after the image forming apparatus is turned on, and if the reset release signal is received, becoming in the reset release state to operate in the normal mode state.

According to still another aspect of the present disclosure, a method for controlling an image forming apparatus including an engine unit performing an image forming job, a sub-controller mounted on the engine unit to perform the image forming job, and a main controller controlling an operation of the engine unit by communicating with an engine controller in a normal mode and being inactivated if the image forming apparatus changes the mode to a low-power mode, the engine controller performing the image forming job by driving the engine unit in the normal mode under the control of the main controller; and if the image forming apparatus changes the mode to the low-power mode, the engine controller providing a service that corresponds to the low-power mode.

In the method for controlling an image forming apparatus according to still another embodiment of the present disclosure, the image forming apparatus may further include first and second memories, and an address change unit setting a memory address to be accessed by the sub-controller in the low-power mode state; and the method for controlling an image forming apparatus may further include the main controller performing a control operation using the first memory in the normal mode state; and if the image forming apparatus changes the mode to the low-power mode, setting the memory address to be accessed by the sub-controller in the second memory under the control of the sub-controller or the main controller.

The main controller and the sub-controller may be arranged in different power domains, and the method for controlling an image forming apparatus according to still another embodiment of the present disclosure may further include the sub-controller intercepting power that is supplied to the power domain in which the main controller is arranged if the low-power mode is performed.

The method for controlling an image forming apparatus according to still another embodiment of the present disclosure may further include the sub-controller performing at least one of a self-refresh mode change of the first memory, a clock speed change for the low-power mode, a network link speed change, and a hardware (H/W) setting for the low-power mode service when the mode is changed from the normal mode to the low-power mode.

Accordingly, the sub-controller (or sub-CPU), which has been used to control scan/engine/fax in a normal mode, can be utilized for the low-power service.

BRIEF DESCRIPTION OF THE DRAWINGS

The above and other aspects, features and advantages of the present disclosure will be more apparent from the following detailed description when taken in conjunction with the accompanying drawings, in which:

FIG. 2 is a flowchart illustrating a method for booting an image forming apparatus according to an embodiment of the present disclosure;

FIG. 4 is a flowchart illustrating a method for controlling an image forming apparatus according to an embodiment of the present disclosure;

FIG. 9 is a flowchart illustrating a method for controlling an image forming apparatus according to still another embodiment of the present disclosure.

DETAILED DESCRIPTION

Embodiments of the present disclosure are described in detail with reference to the accompanying drawings.

Figure 1:
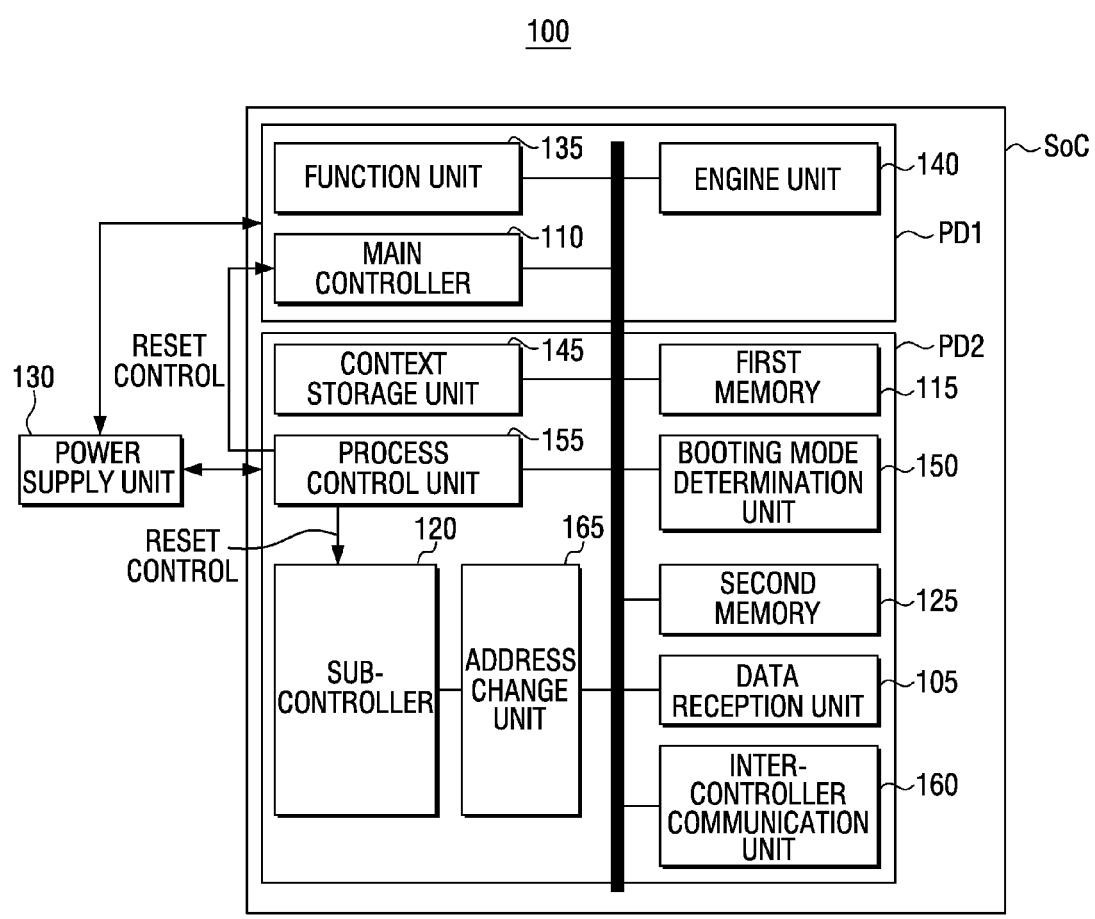
FIG. 1 is a block diagram illustrating the configuration of an image forming apparatus according to an embodiment of the present disclosure.

FIG. 1 is a block diagram illustrating the configuration of an image forming apparatus according to an embodiment of the present disclosure.

Referring to FIG. 1, an image forming apparatus 100 according to an embodiment of the disclosure includes a data reception unit 105, a main controller 110, a first memory 115, a sub-controller 120, a second memory 125, a power supply unit 130, a function unit 135, an engine unit 140, a context storage unit 145, a booting mode determination unit 150, a process control unit 155, an inter-controller communication unit 160, and an address change unit 165.

Here, the image forming apparatus 100 may be typically implemented as a printer, a copy machine, a scanner, a facsimile machine, or a multifunction peripheral (MFP) in which functions of the above-described devices are multiply implemented into one device.

The image forming apparatus 100 may be implemented to include a first power domain region PD1 and a second power domain region PD2, which separately receive power through different power supply lines. Here, the power domain region means a region which receives the power through the same power supply line.

Here, the first power domain region PD1 may include the main controller 110, the function unit 135, and the engine unit 140, and the second power domain region PD2 may include the data reception unit 105, the first memory 115, the second memory 125, the sub-controller 120, the context storage unit 145, the booting mode determination unit 150, the process control unit 155, the inter-controller communication unit 160, and the address change unit 165.

According to the image forming apparatus 100, the main controller 110 and the sub-controller 120 are arranged in one SoC, and the sub-controller performs scan/engine/fax control or the like in a normal mode. For this, the sub-controller typically uses a real-time OS. Here, functions of scan/engine/fax or the like may be performed by the function unit 135 and the engine unit 140. Further, in the case of a low-power mode service, a mode is changed so that a low-power service mode is performed under the control of the main controller 110, and the sub-controller 120 performs the low-power service.

On the other hand, the main controller 110 and the sub-controller 120 may be implemented by one CPU, respectively. Accordingly, the main controller 110 and the sub-controller may be hereinafter called a main CPU and a sub-CPU, respectively.

Further, in addition to the main controller 110 and the sub-controller 120, the date reception unit 105, the first memory 115, the second memory 125, the power supply unit 130, the function unit 135, the engine unit 155, and the inter-controller communication unit 160 may be implemented in one SoC together with the main controller 110 and the sub-controller 120.

Further, the main controller 110, the function unit 135, and the engine unit 140 may be arranged in one SoC, and the date reception unit 105, the sub-controller 120, the second memory 125, the inter-controller communication unit 160, and the address change unit 165 may be arranged in a separate SoC. Further, the first memory 115, the process control unit 145, the context storage unit 150, and the booting mode determination unit 155 may be arranged outside the SoC.

In this case, the sub-controller 120 may be used for another purpose in a normal mode, and may be reset when the mode is changed to a low-power mode. Specifically, when the mode is changed to the low-power mode, the sub-controller 120 is reset, micro firmware for the low-power mode service is stored in the second memory 125, and the sub-controller 120 operates for a low-power mode.

Hereinafter, the operation of the respective constituent elements will be described in detail.

The data reception unit 105 functions to perform data communication with at least one external appliance. Here, the data reception unit 105 may be implemented as a communication module that interfaces with the outside, such as a network, SDIO, USB, SPI, I2C, GPIO (Sensor Input, etc), FAX, or the like. Further, the at least one external appliance may representatively be a host device such as a PC (Personal Computer) or the like, and may be implemented as a user terminal device such as a mobile phone, a PDA, a USB, or the like or an external server.

The main controller 110 controls the while operation of the image forming apparatus 100, and particularly performs a control operation using the first memory 115 to be described later in the normal mode state. Specifically, if a request signal for an image forming job is input in a low-power mode state, the main controller 110 changes the mode to a normal mode, activates the first memory 115, and performs the corresponding operation using the activated first memory 115.

For example, the main controller 110 may take charge of the job reception and processing in the normal mode. The main controller 110 may have a built-in web server to provide a web service, or in a higher copier class, the $3^{rd}$ party application may be installed and served. Further, a general-purpose OS such as Linux may be installed, and in the case of a low-speed popular device, a real-time OS may be installed and the main controller 110 may directly control the scan/engine/fax or the like.

In particular, when the mode is changed from the normal mode to the low-power mode, the main controller 110 copies context information into a context storage unit 145, and when the mode is changed from the low-power mode to the normal mode, it may be booted using the context information stored in the context storage unit 145. Here, the context information may be CPU context information that is lost when the power of the first power domain region PD1 is intercepted. Further, context information of other constituent elements that is lost when the power of the first power domain region PD1 is intercepted may be included therein.

The sub-controller 120 can perform a control operation using the second memory 125 in the low-power mode state, and can operate the engine unit 140 to perform an image forming job under the control of the main controller 110 in the normal mode state.

Specifically, the sub-controller 120 performs a service for portions that require real-time control, such as engine/scan/fax controls or the like, in the normal mode. Since such a service requires a real-time operation, the control is performed using a real-time OS.

When the image forming apparatus enters into the low-power mode, the sub-controller 120 can perform an operation according to a preset signal using the second memory 125 as it maintains the low-power mode. Here, the preset signal may be a state request signal of the image forming apparatus through an application or the like that is provided in a host device (not illustrated) in a state where the maintaining of the low-power mode is possible. For example, the preset signal may be a signal by a smart panel in the host device. Here, the smart panel is a panel provided in the host device to display the state of the image forming apparatus, and for example, the state of the image forming apparatus can be periodically grasped through USB control communication. The user can grasp a print state, a print paper state, a toner state, and a power on/off state of the image forming apparatus in the host device through the smart panel.

On the other hand, when the image forming apparatus enters into the low-power mode, the main controller 110 sends a low-power service change request to the sub-controller 120 using the inter-controller communication unit 160, and the sub-controller 120 changes the mode state to a low-power mode change preparation possible state, and informs the main controller 110 of its state. In this case, if the mode change is not possible due to an engine state or the like, the sub-controller 120 may notify the main controller 110 of a change impossible message.

If the mode change is possible, the main controller 110 resets the sub-controller 120 using the process control unit 155, stores a low-power performing program in the second memory 125, and changes a memory access address so that the program is performed in the second memory when the reset is released. Thereafter, the reset is released, and the low-power mode service is performed. Here, the memory access address change can be performed using the address change unit 165, and the detailed description thereof will be made later in the description of the corresponding block.

If the low-power mode starts, the sub-controller 120 turns off the first power domain PD1, changes the mode state to the low-power state by making the DRAM in a self-refresh state, and performs a low-power service, that is, a wakeup event monitoring service.

Here, the normal mode means a mode in which the image forming apparatus 100 performs a normal operation, and the low-power mode means a mode in which power supply to most modules is intercepted or minimized in order to minimize the power that is consumed when the system performs no operation.

In the low-power mode according to the present disclosure, in order to achieve the lower standby power (equal to or less than 1 W), a method may be used, which makes the main memory (typically, an external DRAM) in a self-refresh state, and operates the program in an internal memory (typically, an internal SRAM) that is not in use in the SoC. For example, the SRAM may be a small-capacity memory of about 128 KB. However, in some cases, an SDRAM may be used, and a ROM may be additionally used in addition to the SRAM or SDRAM.

The first memory 115 is the main memory that is used in the normal mode, and may be implemented by a nonvolatile memory. For example, a DRAM (Dynamic RAM) may be used as the main memory. The first memory 115 is a volatile memory that is used when the main CPU operates, and a DRAM may be used as the first memory. In the low-power mode, the first memory 115 operates in a self-refresh mode, and consumes only minimum power.

Further, the first memory 115 belongs to the second power domain PD2, and is not turned off even in the low-power mode. Accordingly, by restoring the CPU-related information that is stored in the context storage unit 145 when the mode returns to the normal mode, it is possible to return to the just previous performing mode, and thus prompt booting becomes possible.

The second memory 125 is a memory that exists inside the SoC, and may be used as storage of the program code and data of the sub-controller 120 in the low-power mode. For example, in the case of a USB, a program code for controlling the low-power mode may include at least one of a routine for determining whether a signal is input to the date reception unit 105, a routine for performing an operation according to a USB control signal, and a routine that is necessary during wakeup for changing to the normal mode.

In this case, the second memory 125 may be implemented by at least one of an SRAM (Static RAM) and an SDRAM (Synchronous Dynamic Random Access Memory). In addition, a RAMBus, a DRAM, a DDR-SDRAM, or the like, may be used as the second memory 125.

For example, the second memory 125 may be implemented in a manner that the sub-controller 120 reuses the SRAM that is used in the function unit 235 inside the SoC in the low-power mode. However, this is merely exemplary, and the second memory 125 may be configured by a memory outside the SoC or may be implemented using an external ROM and an internal mini-sized SRAM.

Further, at least one of a ROM (Read Only Memory) and a flash memory may be used to store a code that is necessary in implementing the low-power mode.

According to one embodiment of the present disclosure, the second memory 125 may be implemented by an SRAM. In this case, the SRAM may be used to copy the code that is necessary when implementing the low-power mode, which is stored in a DRAM or a ROM, a flash memory, or the like.

Further, the second memory 125 may be implemented by an SRAM, and may be used to execute a code that is necessary when implementing the low-power mode, which is stored in the ROM, a flash memory, or the like.

Further, the second memory 125 may be implemented by an SDRAM, and may be used to execute a code that is necessary when implementing the low-power mode, which is stored in the ROM, a flash memory, or the like.

Further, the second memory 125 may be used together with the first memory 115 in the normal mode. That is, the SRAM that is used as a buffer in processing an image in the normal mode can be reused as the second memory 125 in the low-power mode.

Hereinafter, for help in understanding the present disclosure, features of the respective memories will be briefly described.

The SRAM has the feature of maintaining the data while the power is supplied to the memory. Since the SRAM does not require a periodic rewriting work, the data can be maintained once a write operation. The SRAM is a small-capacity memory, and has the drawbacks in that it is expensive in comparison to the DRAM although its operating speed is very high. Accordingly, the SRAM is used in a place where high speed is required, but large capacity is not required, such as a cache memory.

The DRAM, unlike the SRAM, has the characteristic that it should be continuously rewritten in order to maintain the data. Accordingly, the DRAM is a large-capacity memory that is relatively slower than the SRAM, and is used as a main memory in most systems.

The SDRAM has the characteristic that it operates in synchronization with a system clock. In theory, the SDRAM can be in synchronization with the system bus speed of up to 200 MHz. Since the SDRAM operates in dependence on the system clock, it is expected that the system speed is improved.

The power supply unit 130 supplies the power to the image forming apparatus 100.

Specifically, the power supply unit 130 supplies the power to the first power domain region PD1 and the second power domain region PD2 in the normal mode, and intercepts the power supply to the first power domain region PD1 and supplies the power only to the second power domain region PD2 in the low-power mode.

On the other hand, in the above-described embodiment, it is exemplified that the main controller 110 and the sub-controller 120 are implemented by CPUs, respectively, to control the image forming apparatus 100. However, in some cases, the main CPU (not illustrated) and the sub-CPU (not illustrated) may be implemented to provide a command to the main controller (not illustrated) and the sub-controller (not illustrated) so that the respective configurations can perform the corresponding operations.

Further, the image forming apparatus 100 according to an embodiment of the present disclosure may include a PLL unit (not illustrated) that generates different operating frequencies. The PLL unit (not illustrated) may provide the generated operating frequencies to the main controller 110, the sub-controller 120, the first memory 115, and the second memory 125.

The function unit 135 performs diverse functions, such as image processing, image compression, image decompression, and the like, that should be processed in the engine unit 140 in order to perform the image forming job, such as print, copy, scan, and the like.

The operation module (not illustrated) may include diverse function modules that are not included in the function unit 135 due to the capacity limitations of the function unit 135. The operation module (not illustrated) may include at least one function module, and the respective function modules may be implemented into one chip.

The function unit 135 and the engine unit 140 are positioned in the first power domain PD1 together with the main controller 110, and in the case where no operation is required such as in the low-power mode, the power supply thereto is cut off by the power supply unit 130.

On the other hand, if the preset condition is satisfied, the main controller 110 may change the mode form the normal mode to the low-power mode. For example, there may be no command for a preset time. However, this is merely exemplary, and diverse mode change events may be provided.

As described above, if it is required to change the mode from the normal mode to the low-power mode, the main controller 110 may copy a program for controlling the low-power mode from the first memory 115 to an executable area of the second memory 125, or may copy a program stored in a separate ROM or a flash memory into an executable area of the second memory 125. Accordingly, much smaller capacity is required in comparison to the USB program that is stored in the first memory 115, which is used in the normal mode. Once the code copy is completed, the power supply to the first power domain PD1 is intercepted and the apparatus enters into the low-power mode.

On the other hand, the code copy may be performed in a manner that the code that is stored in the flash memory or the ROM is copied into the DRAM to be used, or the code is copied into the SRAM to be used when the apparatus enters into the low-power mode.

The sub-controller 120 changes the mode from the low-power mode to the normal mode if the preset condition is satisfied. For example, in the case of a printer, if there is an event, such as panel key input, printing service request, fax ring, or the like, the sub-controller 120 may change the mode from the low-power mode to the normal mode.

In general, the main reason why the booting time (the booting process may include a DRAM initialization, a code copy from the ROM to the DRAM, a H/W initialization process, an OS booting, and service program start) when the mode returns from the low-power mode to the normal mode is equal to the initial booting time is that as the power supply to the first power domain in which the main controller (not illustrated) and the DRAM (not illustrated) are arranged is cut off to change the mode to the low-power mode, the power supply to the main controller (not illustrated) and the DRAM (not illustrated) is cut off, and thus the same procedure as the initial booting process is performed when the power is applied.

However, as described above, according to an embodiment of the present disclosure, the first memory 115 that is used in the normal mode is arranged in the second power domain PD2 that is supplied with a separate power through a power supply line that is different from the first power domain PD1 in which the main controller 110 is arranged, and the state of the first memory 115 is changed to a "self-refresh" state while the power supply to the first memory 115 is not cut off, but is maintained to maintain the contents of the first memory 115. Accordingly, although the power of the DRAM is not switched off, the power consumption is reduced from 1 to 2 W to 200 mW or less to achieve the low-power consumption.

Further, even though the data stored in the first memory 115 is maintained, the power is reapplied to the main controller 110 after the power-off, that is, power switching, of the first power domain PD1, and thus the performing context of the main controller 110 may be lost. For example, in the case where the main controller 110 is implemented by ARM, register set and status register may be in the performing context, and in addition, set values of IP blocks inside the SoC may be therein. For reference, an ARM CPU has a similar clock to that of the CPU for a desk top PC, but the power consumption is 40 to 450 mW, which is very low in comparison to that of the CPU for a desk top PC.

By contrast, according to the image forming apparatus as illustrated in FIG. 1, the main controller 110 stores the essential performing context information of the main controller 110, the function unit 135, and the engine unit 140, which may be lost when the power supply to the first power domain PD is intercepted, in the context storage unit 145 of the second power domain PD2. Accordingly, the restoration to the previous state that is before the low-power mode state is performed using the context stored in the context storage unit 14 during the rebooting, and thus it is possible to perform prompt rebooting.

The context storage unit 145 is a place in which information, which is restored during returning to the previous state, among the constituent elements that belong to the first power domain in which information is lost when the power supply to the first power domain PD1 is cut off by the power supply unit 130 is stored.

The context storage unit 145 may be a DRAM, and may be any memory, in which information is not lost when the first power domain PD1 is turned off, such as NAND, NOR, SPI, SRAM, SoC internal memory, or the like. For example, the main backup information may be information of the ARM CPU, such as register set and status register in the ARM CPU, and may also be set values of IP information inside the SoC.

The booting mode determination unit 150 functions to determine whether the booting is a normal mode booting or a return from the low-power mode to the normal mode. Here, the normal mode booting means rebooting when the power is reapplied to the main controller 110 by the power supply unit 130. Accordingly, the booting mode determination unit 150 may be implemented by a register that can store the corresponding information inside the SoC.

If the booting mode determination unit 150 determines that the booting mode is the low-power return mode, the main controller 110 reads the register value of the booting mode determination unit 150 before the initialization such as PLL/DDR, and performs a general booting procedure if the booting mode is the normal mode booting.

Further, if the booting mode determination unit 150 determines that the booting mode is the low-power return mode, the main controller 110 restores the register and status register for each CPU operation mode from the context storage unit 145, and returns to the last performing point to make the booting within several milliseconds possible. That is, the main controller 110 skips an initialization process such as PLUDDR, releases the first memory 115 from the self-refresh mode, and directly returns to the previous performing state (before the change to the low-power state) using the information stored in the context storage unit 145.

The booting mode determination unit 150 may be implemented to store the booting mode using the register, and may determine the mode through an input from an external GPIO pin or the like. Accordingly, the main controller 110 re-performs a reset vector and the subsequent process, and prevents the process from flowing in the same manner as the system power supply booting process.

On the other hand, in the case of changing the mode form the low-power mode to the normal mode, the first memory 115 in the low-power mode should get out of the self-refresh state. In this case, the main controller 110 may finish the "self-refresh" mode as booting the system, or the sub-controller 120 may finish the "self-refresh" mode of the first memory 115.

The process control unit 155 can perform control of the sub-controller 120 when the apparatus enters into the low-power mode. Specifically, the process control unit 155 may change the mode of the first memory 115 to the self-refresh mode, and control the interception of the power supply to the first power domain region PD1.

Further, the process control unit 155 may perform the booting control of the main controller 110 and the sub-controller 120.

Specifically, the process control unit 155 controls reset of the sub-controller 120 and the main controller 110 which is the core element that enables the mode changed in the low-power state while the sub-controller 120 performs the real-time service (control of scan/engine or the like). Generally, if the CPU is in a reset state, it does not operate and stops even if the power is applied thereto, and if the reset is released, it re-performs the operation from the initial state. According to the present disclosure, using the above-described feature, the sub-controller 120 is made to be in a reset state to stop the performing by using the process control unit 155 when the apparatus enters into the low-power mode, a low-power service code is mounted in the second memory 125, and the reset is released after the memory access address is changed using the address change unit 165 so that the code of the second memory can be performed. Accordingly, the sub-controller 120 can perform the low-power service.

The inter-controller communication unit 160 functions to perform message (command) transmission/reception between the main controller 110 and the sub-controller 120.

For example, the inter-controller communication unit 160 may be used when the main controller 110 requests mode change (change to the low-power mode) from the sub-controller 120 or when the sub-controller 120 reports its own state to the main controller 110.

In this case, the inter-controller communication unit 160 may use a message transmission method using FIFO, and may be configured as a separate logic that can generate IRQ between controllers. As an example, the inter-controller communication unit 160 may be implemented using a PL390 interrupt control of ARM Company.

The address change unit 165 is a logic that changes the address output from the sub-controller 120 to a specified address. For example, in the case of an ARM CPU, the CPU jumps to a specified address (vector address) when the reset of the CPU is released. Further, even in the case where an interrupt occurs, the CPU moves to the specified address. As an example, the specified address is 0x0 address or 0xffff0000 address. Accordingly, in the case of the ARM CPU, an address map is formed by positioning the DRAM in the 0 address.

However, in the low-power mode according to the present disclosure, the first memory 115 that is implemented by the DRAM is not used, but the second memory 125 is used. The second memory 125 is allocated with an address that is not the address of the first memory 115, and a remapping process is required in order for the CPU to use the second memory 125. That is, if an approach to the 0x0 address is made, the address change unit 165 moves the address to the first memory 115 in the normal mode, and moves the address to the second memory 125 in the low-power mode. Accordingly, using the process control unit 155 and the address change unit 165, the sub-controller 120 is changed from the real-time processing CPU to the low-power processing CPU.

As described above, the image forming apparatus according to the present disclosure performs a real-time job process (scan, fax, engine control) using one sub-controller in the general mode, and performs a low-power standby mode service, that is, services, such as wakeup event monitoring, network packet responding (ARP, ICMP, and appliance state query responding), appliance state responding using USB, and the like.

Hereinafter, the relationship between the image forming apparatus 100 as illustrated in FIG. 1 and the host device (not illustrated) will be briefly described.

The host device (not illustrated) may be representatively implemented by a PC, and in some cases, it may be implemented in diverse types, such as a PDA, a PMP, a TV, and a server.

The host device (not illustrated) includes an application (not illustrated) and a host controller (not illustrated).

The application (not illustrated) may be software that supports diverse data communication functions in the OS (Operating System).

The host controller (not illustrated) may be in the form of all S/W and H/W that enable the image forming apparatus 100 to be coupled to the host device (not illustrated).

In addition, the host device (not illustrated) may further include a printer driver (not illustrated) or the like that converts print data that is prepared by an application program into a printing language that can be analyzed in the image forming apparatus 100, and may be implemented in the form that is included in the host controller (not illustrated).

Further, the hose device may include normal constituent elements of the host device (not illustrated), such as an input unit (not illustrated), a display unit (not illustrated), and the like.

On the other hand, the constituent elements as illustrated in FIG. 1 and their arrangement order are merely exemplary, and if necessary, part of the constituent elements may be deleted, other constituent elements may be added, and the order may be changed.

FIG. 2 is a flowchart illustrating a method for booting an image forming apparatus according to an embodiment of the present disclosure.

According to the booting method of the image forming apparatus as illustrated in FIG. 2, when the power is applied to the system, the reset of the main CPU is released by the control logic inside ASIC (S301), and the reset of the sub-CPU is not released to be stopped. The reason why the main and sub-CPUs are designed as above is as follows. Generally, if the reset of the CPU is released, the CPU jumps to a place that is called a reset vector, and in this case, the two CPUs perform a code of the same place on one bus. In this case, a different kind of CPU performs one code, and in the case of using a code that is not compatible even if the CPU is of the same series (for example, ARM), the booting may be impossible. Otherwise, reset vectors of the two CPUs may be separately set (in the case of the ARM, 0x0 or 0xffff0000), and a method that uses the ROMs, respectively, may be used. In this case, however, a separate memory is additionally required. Further, if several CPUs enter into one ASIC, most hardware may be shared, and in such a system, a complicated synchronization, such as which CPU is initialized and when the performing is finished, should be performed. Accordingly, in the present disclosure, when the power is applied to the system, the reset of the sub-CPU is not released, and the main CPU finishes the H/W initialization and releases the reset of the sub CPU to simplify the initialization process.

Then, if the reset is released, the main CPU performs a code in the reset vector. For example, the main CPU performs H/W initialization process, for example, such as performing of CPU initialization, PLL (clock) setting, and DDR setting (S205). When this process is finished, it becomes possible to access the DRAM.

Then, the main CPU copies the program code that the sub-CPU is to perform into the DRAM (S210). In this case, a typical AMP system (a system in which this kind of CPU shares one bus) may divide and use the area of the DRAM.

Figure 3A:
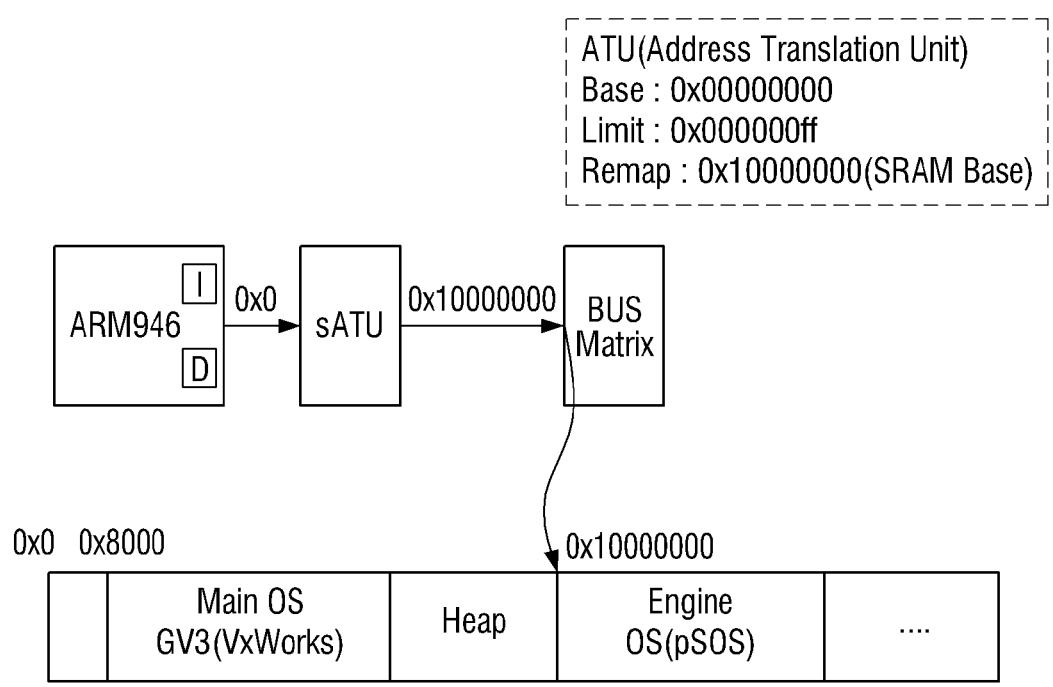
FIG. 3A is a diagram illustrating the configuration of an address change unit according to an embodiment of the present disclosure and an access point.

Then, the address change setting by ATU is performed (S215). The reason will be simply described. Generally, in the case where the reset of the sub-CPU is released, the code of the reset vector is performed. As illustrated in FIG. 3A, the code is accessed with 0x0 address. However, in the case of accessing the 0x0 address as it is, the address may overlap the reset address of an area that the main OS uses to cause a malfunction to occur. In order to prevent this, a preset address area is set, and if the access address of the sub-CPU is included in the set address area, ATU performs the function of changing the address to the specified address. In the embodiment as illustrated in FIG. 3A, addresses of 0x0 to 0xff are set in the preset address area, and if the access address of the sub-CPU is included in the corresponding address area, the address is changed to 0x100000000 address to perform the corresponding operation.

Then, the main CPU releases the reset of the sub-CPU using the process control unit 255 (S220).

The main CPU copies the main program (OS) into the DDR memory (S225), and proceeds with the booting process such as main program booting or the like (S230). Then, the main CPU is changed to an operation state (S235). Here, it is also possible to proceed with the operations of S210, S215, and S220 after the main program (OS) booting operation (S230).

On the other hand, the sub-CPU performs the reset vector and the subsequent process according to the reset release operation. Specifically, the sub-CPU can perform a hardware initialization task such as sub-program (for example, real-time OS) booting (S240). Further, the sub-CPU may send a signal of "preparation ready" to the main CPU using the inter-controller communication unit 160 (S245). Thereafter, the sub-CPU is changed to an operation state (S250). However, the operation S245 can be omitted according to circumstances.

Figure 3B:
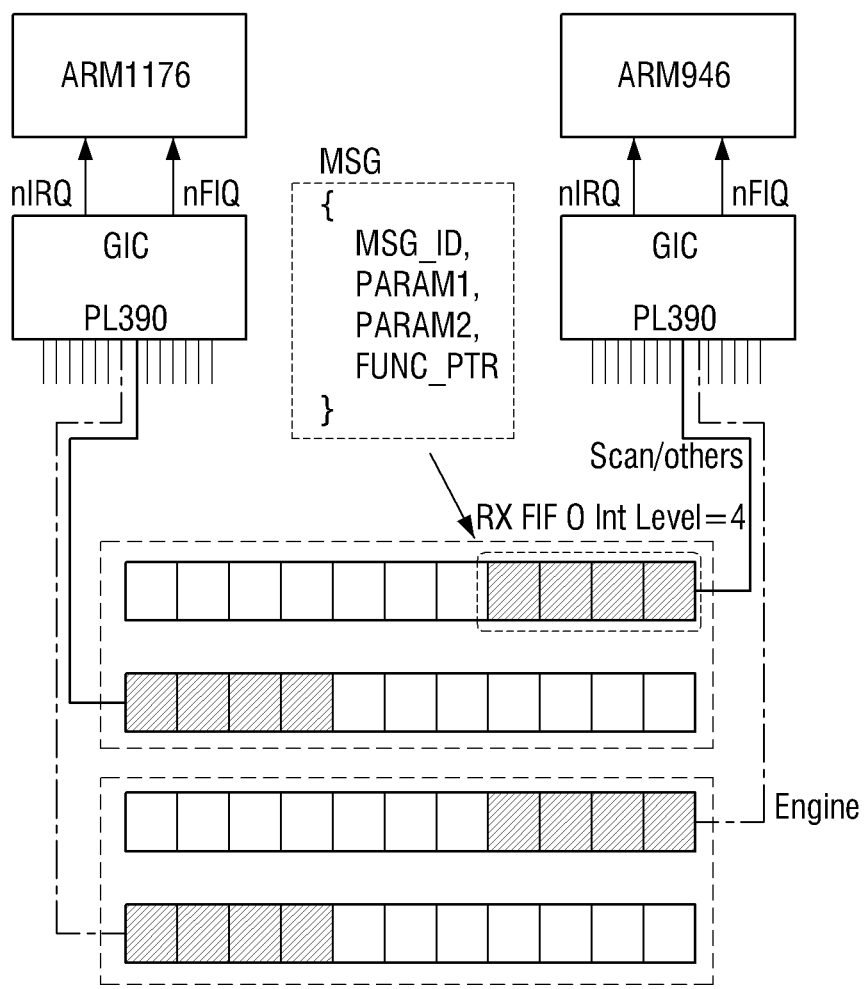
FIG. 3B is a diagram illustrating the configuration of an inter-controller communication unit according to an embodiment of the present disclosure.

FIG. 3B is a diagram illustrating the configuration of an inter-controller communication unit 160 implemented by a message queue that is implemented by FIFO in the ASIC. If the main CPU writes a message in FIFO, an interrupt occurs in the sub-CPU, and the sub-CPU confirms the corresponding message through an operation of reading the FIFO. This is exemplary, and the inter-controller communication unit 160 may be implemented in diverse methods, such as Uart, simple IRQ generation, and the like.

FIG. 4 is a flowchart illustrating a method for controlling an image forming apparatus according to an embodiment of the present disclosure.

In the method for controlling an image forming apparatus as illustrated in FIG. 4, it is assumed that the sub-CPU has a low-power service code.

According to the method as illustrated in FIG. 4, if a preset low-power change condition is satisfied ("Y" in S410) in a general operation state (S405), the main controller prepares a low-power mode state (S415). Here, the general operation state may be a job performing state such as printing/scan or the like, and the preset low-power mode change condition may be a case where an idle time is maintained for a preset time or more after the job performing is completed.

In operation S415, the sub-controller 120 mounts a microcode or the like for performing the low-power mode service in the second memory 125 for the low-power service, and performs various kinds of pre-tasks for changing the low-power mode, such as interrupt controller backup and service stop, main timer stop, and the like.

After completion of the low-power mode state preparation task, the main controller performs backup of its performing context information in the context storage unit 145 (S420).

Thereafter, the main controller requests the low-power mode change from the sub-controller (S425). On the other hand, since cache information of the main controller is also lost when the power is switched, the cache data is reflected through cache flush in the DRAM.

In operation S425, the main controller reports the low-power service start to the sub-controller, and waits for the switching of the power.

The sub-controller changes the mode to the low-power service mode if it receives the low-power service request from the main controller in operation S425.

Specifically, if the sub-controller receives the low-power serve performing request ("Y" in S435) in the general operation state (S430), it copies a low-power service program into the second memory 125 that is accessible when the DRAM is turned off (S440).

Further, the sub-controller sets the ATU for performing the same in a position of the second memory 125 when the interrupt occurs (S445). Thereafter, the sub controller performs the low-power service by changing the program counter to the position of the second memory 125 as the program performing position (S450).

Then, for the low-power mode, the sub-controller performs tasks, such as clock speed change, network link speed change, and H/W setting for the low-power service.

Then, the sub-controller changes the first memory 115 to the self-refresh state in order to operate with a standby power of 1 W or less (S455).

Thereafter, the sub-controller enters into the low-power service operation state with the standby power of 1 W or less (S465) by switching the power so that the power of the first power domain PD1 is changed before the low-power mode service operation state (S460).

On the other hand, the low-power service mode in an example used in the present disclosure may be implemented as follows.

1. The first memory 115, that is, the DRAM, is changed to the self-refresh mode, the power of the main controller is intercepted or the clock is stopped, and only 10pin that is required in the wakeup event is activated (the wakeup event may include diverse sources, such as job reception through a network, fax reception, USB print request, user's button click, UI panel click, and the like).

2. Power switching and clock off in the SoC and on the board

3. The bus operation speed and the CPU operation speed are changed to the minimum speeds (up to the service supportable speed. For example, in the case of a USB device, the normal operation is performed at 30 MHz or more. In this embodiment, the operation speed of the sub-CPU is lowered up to 30 MHz and the operation speed of the internal bus is lowered up to 30 MHz).

4. Main CPU power switching

5. Network operation speed change (the link speed is lowered from one GHz to 10 MHz. In the case of supporting an EEE (Energy Efficient Ethernet) function, the link speed is automatically changed)

6. Mode is changed so that the CPU can use the internal memory, which has been used to perform the printing function inside the SoC, in the low-power mode state.

7. L2 cache controller is turned off for additional low-power state

Figure 5:
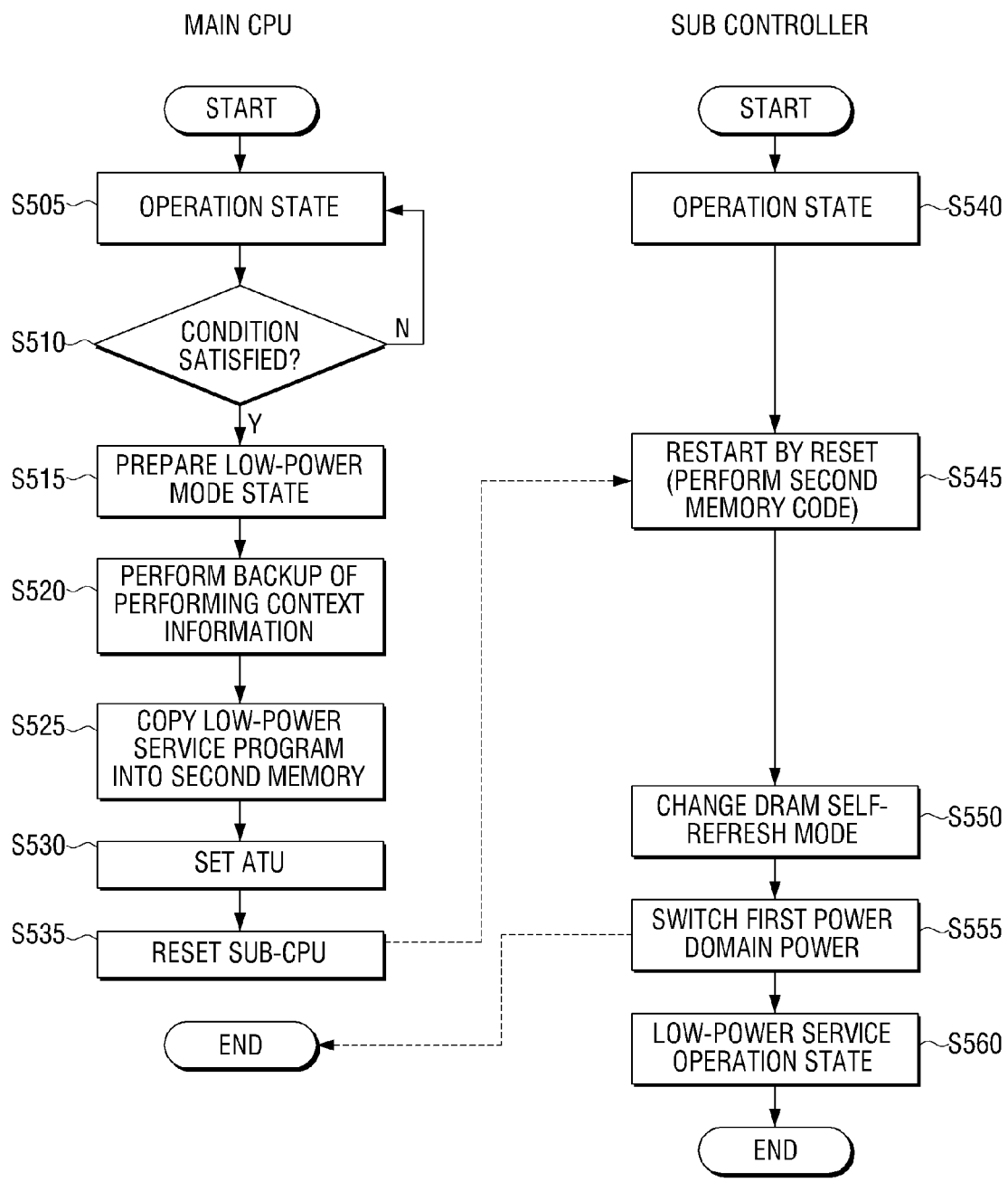
FIG. 5 is a flowchart illustrating a method for controlling an image forming apparatus according to another embodiment of the present disclosure.

FIG. 5 is a flowchart illustrating a method for controlling an image forming apparatus according to another embodiment of the present disclosure.

In the method for controlling the image forming apparatus as illustrated in FIG. 5, unlike the method as illustrated in FIG. 4, it is assumed that the main CPU manages the low-power service code.

In the case where the main CPU manages the low-power service code, a method, in which the main CPU copies the low-power service code into the second memory and restarts the sub-CPU in the low-power service mode using the process control unit 155, may be used rather than a method, in which the main CPU requests the low-power service change from the sub-CPU, and the sub-CPU copies the low-power code into the second memory (FIG. 4).

According to the method for controlling the image forming apparatus as illustrated in FIG. 5, if the preset mode change condition is satisfied ("Y" in S510) in a general operation state (S505), the main CPU prepares the low-power mode state (S515). In this case, the main CPU inquires the sub-CPU of whether the low-power state is possible, and if a response which indicates that the low-power state is possible is received, the main CPU may send a low-power mode change command to the sub-CPU. The sub-CPU is changed to a state where the CPU does not operate any more when the change command is received. Specifically, the sub-CPU is changed to a state where the sub-CPU does not send any request to outside. For example, in the case of the ARM, the interrupt reception is stopped, and the state is changed to a WFI mode.

Then, the main CPU stores the performing context information that should be backed up when the first power domain PD1 is turned off (S520).

Further, the main CPU copies the low-power service program that should be driven when the sub CPU restarts into the second memory 125 (S525).

Then, the main controller sets the ATU so that the sub-controller is driven in the second memory 125 when the reset is released (S530). Here, the order of the operations S525 and S530 may be changed to each other.

Thereafter, the main CPU resets the sub-CPU using the process control unit 155 (S535).

Once the reset is performed, the sub-CPU restarts from the rest vector (S545). At this time, since the ATU is changed to the second memory 125 by the main controller, the sub-CPU performs a code of the second memory 125, that is, the low-power service code.

Then, for the low-power mode, the sub-CPU performs clock speed change, network link speed change, and H/W setting for the low-power service (S550).

Then, the sub-CPU changes the first memory 115 to the self-refresh state to operate with the standby power of 1 W or less.

Thereafter, the sub-CPU enters into the low-power service operation state with the standby power of 1 W or less (S560) by switching the power so that the power of the first power domain PD1 is switched before the low-power service operation state (S555).

Figure 6:
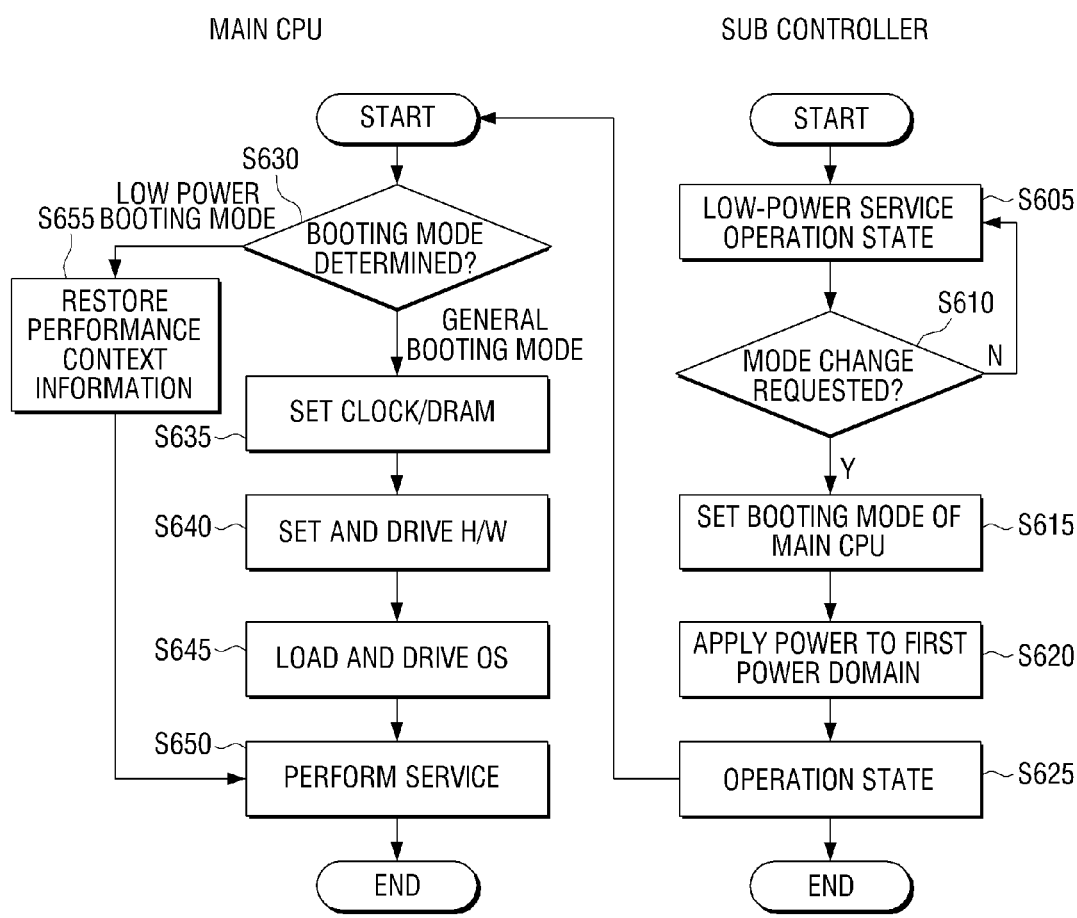
FIG. 6 is a flowchart illustrating a restoring process from a low-power mode to a normal mode according to an embodiment of the present disclosure.

FIG. 6 is a flowchart illustrating a restoring process from a low-power mode to a normal mode according to an embodiment of the present disclosure.

According to the restoring process as illustrated in FIG. 6, if there is a normal mode change request ("Y" in S610) in a low-power service operation state (S605), the sub-controller takes the restoring procedure to the image forming service mode.

First, in order for the main controller to determine the low-power mode booting rather than the normal booting during the restoring, the sub-controller designates the low-power mode booting state in the booting mode determination unit 150 (S615). However, it is possible to perform the task in operation S615 even in the low-power mode entering process that is not the restoring process.

Then, the sub-controller applies the power to the first power domain to boot the main controller (S620), and releases the rest of the main CPU through the process control unit 155 (S625). Accordingly, the main controller performs the booting. On the other hand, in a system in which the reset is automatically released when the main controller applies the power thereto, the operations S620 and S625 may be integrated into one operation.

The CPU may be reset after the mode is changed from the low-power mode to the normal mode before the reset of the main CPU is released in operation S625, and in the case of the low-power booting mode, the main CPU may change the mode to the normal mode before the operation S630. Here, the normal mode means that the first memory 115 gets out of the self-refresh mode, the CPU and internal bus operating speeds are restored to the normal mode speed, and other internal hardware is changed to a state in which the job processing is possible. However, according to the system, the clock and the power may be applied to a portion of the system only during the job processing, and the portion that is not necessary in the job processing may additionally support the functions of power off and clock switching.

If the main CPU is booted by the sub-CPU, the main CPU determines the booting mode through the booting mode determination unit 150 (S630).

If the general booting mode is determined in operation S630, the service is performed (S650) through general system booting procedures, such as clock/DRAM setting (S635), H/W setting and driving (S640), and OS loading and driving (S645).

If the low-power booting mode is determined in operation S530, since the DRAM is not in a power-off state, but is in a self-refresh mode, it simply gets out of the self-refresh mode. By doing so, the main CPU is in a DRAM-accessible state, and all information before the entering to the low-power mode is contained in the DRAM. However, the CPU context, that is, information of the register and the status register is lost, and thus the restoring to the previous state is not directly performed. For this, the main controller restores the information that is stored in the context storage unit 145 (S655). As described above, the registers for respective modes are all restored, and the "PC" value is finally moved to the previous performing point to restore to the service performing state before entering into the low-power mode.

Here, minimum H/W registers, except for the information that is lost when the power supply to the CPU context CPU core is cut off, may be added to the context information, and since the DRAM is in the self-refresh state, the storing and restoring time may be several hundreds of μs or less in the same manner as storing information in an area of the SRAM or DRAM inside the SoC.

Figure 7:
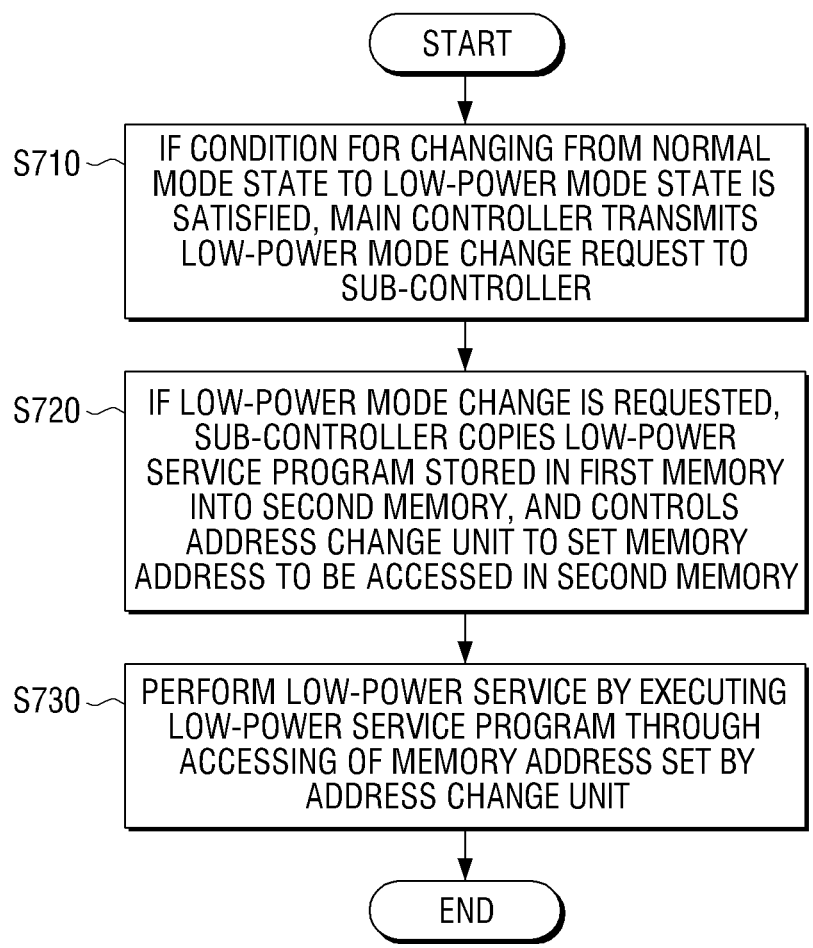
FIG. 7 is a flowchart illustrating a method for controlling an image forming apparatus according to an embodiment of the present disclosure.

FIG. 7 is a flowchart illustrating a method for controlling an image forming apparatus according to an embodiment of the present disclosure.

The image forming apparatus that is applied to the method for controlling the image forming apparatus of FIG. 7 may include first and second memories, a main controller performing a control operation using the first memory in a normal mode state, a sub-controller mounted on the engine unit to perform an image forming job by driving the engine unit in the normal mode state under the control of the main controller, an inter-controller communication unit relaying communication between the main controller and the sub-controller, and an address change unit setting a memory address to be accessed by the sub-controller in the low-power mode state.

According to the method for controlling the image forming apparatus as illustrated in FIG. 7, if the condition for changing the mode state from the normal mode state to the low-power mode state is satisfied, the main controller transmits a low-power mode change request to the sub-controller (S710).

Then, if the low-power mode change request is received, the sub-controller copies the low-power service program stored in the first memory into the second memory, and controls the address change unit to set the memory address to be accessed in the second memory (S720).

Thereafter, the sub-controller performs the low-power service by executing the low-power service program through accessing of the memory address set by the address change unit (S730).

Here, the main controller and the sub-controller are arranged in different power domains, and the method for controlling the image forming apparatus may further includes the sub-controller intercepting the power that is supplied to the power domain in which the main controller is arranged if the low-power mode is performed.

Further, if the image forming apparatus is turned on, the power can be supplied to the respective power domains in which the main controller and the sub-controller are arranged.

Further, if the image forming apparatus is turned on and the power is supplied, the main controller becomes in a reset release state to perform initialization, sets the access address by controlling the address change unit, transmits a reset release signal to the sub-controller, and then operates in the normal mode state by booting the main program after transmitting the reset release signal to the sub-controller.

Further, the sub-controller maintains the reset state until the reset release signal is received after the image forming apparatus is turned on, and if the reset release signal is received, the sub-controller becomes in the reset release state to operate in the normal mode state.

Figure 8:
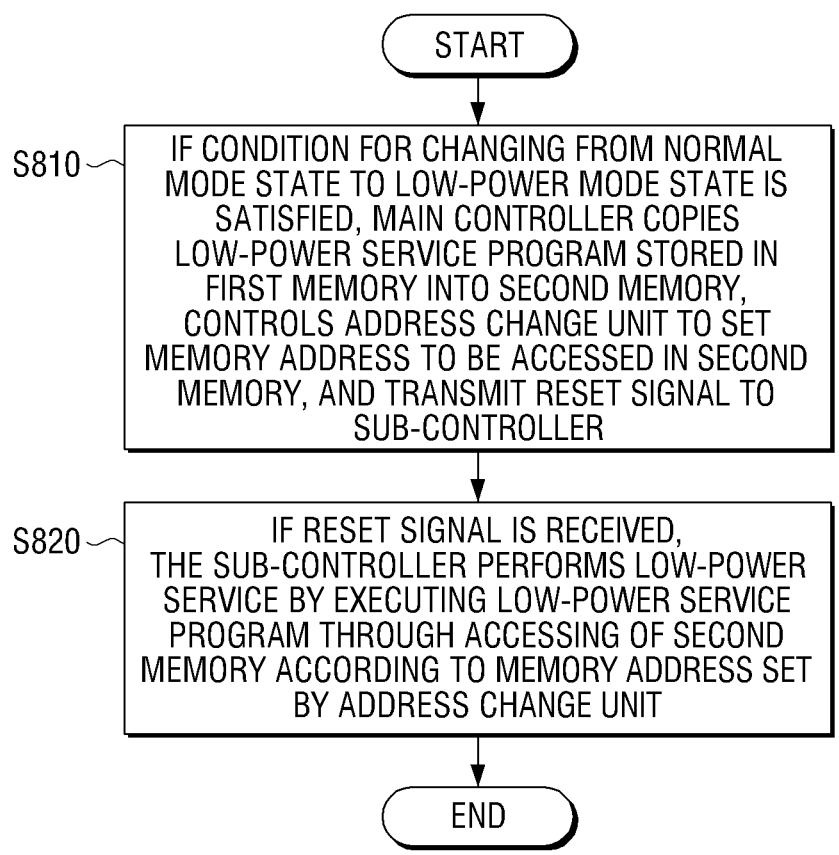
FIG. 8 is a flowchart illustrating a method for controlling an image forming apparatus according to another embodiment of the present disclosure.

FIG. 8 is a flowchart illustrating a method for controlling an image forming apparatus according to another embodiment of the present disclosure.

The image forming apparatus that is applied to the method for controlling the image forming apparatus as illustrated in FIG. 8 may include first and second memories, a main controller performing a control operation using the first memory in a normal mode state, a sub-controller mounted on the engine unit to perform an image forming job by driving the engine unit in the normal mode state under the control of the main controller and to perform a low-power service in a low-power mode state, an inter-controller communication unit relaying communication between the main controller and the sub-controller, and an address change unit setting a memory address to be accessed by the sub-controller in the low-power mode state.

According to the method for controlling the image forming apparatus as illustrated in FIG. 8, if the condition for changing the mode state from the normal mode state to the low-power mode state is satisfied, the main controller copies the low-power service program stored in the first memory into the second memory, and transmits the reset signal to the sub-controller (S810).

Then, if the reset signal is received, the sub-controller performs the low-power service by executing the low-power service program through accessing of the second memory according to the memory address set by the address change unit (S820).

Further, the main controller and the sub-controller are arranged in different power domains, and if the low-power mode is performed, the sub-controller intercepts the power that is supplied to the power domain in which the main controller is arranged.

Further, the image forming apparatus further includes a power supply unit supplying power to the respective power domains in which the main controller and the sub-controller are arranged if the image forming apparatus is turned on, and if the image forming apparatus is turned on and the power is supplied, the main controller becomes in the reset release state to perform the initialization, sets the access address by controlling the address change unit, transmits the reset release signal to the sub-controller, and then operates in the normal mode state by booting the main program after transmitting the reset release signal to the sub-controller.

Further, the sub-controller maintains the reset state until the reset release signal is received after the image forming apparatus is turned on, and if the reset release signal is received, the sub-controller becomes in the reset release state to operate in the normal mode state.

FIG. 9 is a flowchart illustrating a method for controlling an image forming apparatus according to still another embodiment of the present disclosure.

The image forming apparatus that is applied to the method for controlling the image forming apparatus may include an engine unit performing an image forming job, a sub-controller mounted on the engine unit to perform the image forming job, and a main controller controlling an operation of the engine unit by communicating with an engine controller in a normal mode and being inactivated if the image forming apparatus changes a mode to a low-power mode.

According to the method for controlling the image forming apparatus as illustrated in FIG. 9, the engine controller performs the image forming job by driving the engine unit in the normal mode under the control of the main controller (S910).

Then, if the image forming apparatus changes the mode to the low-power mode, the engine controller provides a service that corresponds to the low-power mode (S920).

Here, the image forming apparatus may further include first and second memories, and an address change unit setting a memory address to be accessed by the sub-controller in the low-power mode state, and the main controller can perform the control operation using the first memory in the normal mode state.

Further, if the image forming apparatus changes the mode to the low-power mode, the sub-controller sets the memory address to be accessed in the second memory under the control of the sub-controller or the main controller.

Further, the main controller and the sub-controller are arranged in different power domains, and if the low-power mode is performed, the sub-controller intercepts the power that is supplied to the power domain in which the main controller is arranged.

Further, the sub-controller performs at least one of a self-refresh mode change of the first memory, a clock speed change for the low-power mode, a network link speed change, and a hardware (H/W) setting for the low-power mode service when the mode is changed from the normal mode to the low-power mode.

Further, the present disclosure may include a non-transitory computer readable recording medium that includes a program for executing the method for controlling the image forming apparatus as described above. The computer readable recording medium includes all kinds of non-transitory recording devices in which data that can be read by a computer system is stored. Examples of the non-transitory computer readable recording mediums may include a ROM, a RAM, a CD-ROM, a magnetic tape, a floppy disk, and optical data storage device, and the computer readable recording medium may store and execute codes which are distributed in the computer system that is connected to a network and can be read by a computer in a distribution method.

Further, the embodiments of the present disclosure may be applied to diverse communication methods, for example, network communication, USB, Bluetooth, HDMA (High Definition Multimedia Interface), PCI (Peripheral Component Interconnect) express, Ethernet, ZigBee, FireWire, CAN, IEEE 1394, PS/2, AGP (Accelerated Graphics Port), ISA (Industry Standard Architecture), MCA (Micro Channel Architecture), EISA (Extended Industry Standard Architecture), VESA (Video Electronics Standard Architecture), and the like.

On the other hand, in the above-described embodiments, the image forming apparatus is exemplified. However, it is merely exemplary, and the same principle and configuration can be applied to other electronic appliances to which the technical concept according to the present disclosure can be applied.

As described above, according to the present disclosure, one CPU is used for the real-time service in the normal mode and is used for the low-power service in the low-power mode, and thus the number of gate counters of the ASIC can be reduced to improve the cost competitiveness. That is, the sub-controller (or sub-CPU), which has been used to control scan/engine/fax in a normal mode, can be utilized for the low-power service. Further, the AMP system, which is complicatedly implemented using software MMU or a special technique, can be simply implemented using the ATU.

While the disclosure has been shown and described with reference to certain embodiments thereof, it will be understood by those skilled in the art that various changes in form and detail may be made therein without departing from the spirit and scope of the invention, as defined by the appended claims.

What is claimed is:

1. A method for controlling an image forming apparatus including first and second memories, a first controller performs a control operation using the first memory and an image forming job in a normal state, and a second controller performs a low-power service in a low-power state, the method comprising:
   the first controller copying a low-power service program stored in the first memory into the second memory and transmitting a control signal to the second controller when a condition for changing a state from the normal state to the low-power state is satisfied; and
   the second controller performing the low-power service by executing the low-power service program through accessing of the second memory when the control signal is received.

2. The method for controlling an image forming apparatus as claimed in claim 1, wherein the image forming apparatus further includes an inter-controller communication unit relaying communication between the first controller and the second controller, and an address change unit setting a memory address to be accessed by the second controller in the low-power state; and
   the method for controlling the image forming apparatus further comprises the first controller operating to set the memory address to be accessed in the second memory;
   wherein the operation of performing the low-power service performs the lower-power service by executing the low-power service program through accessing of the second memory according to the set memory address.

3. The method for controlling an image forming apparatus as claimed in claim 2, wherein the first controller and the second controller are arranged in different power domains, and
   the method for controlling an image forming apparatus further comprises the second controller intercepting power that is supplied to the power domain in which the first controller is arranged when the low-power service is performed.

4. The method for controlling an image forming apparatus as claimed in claim 2, wherein the image forming apparatus further includes a power supply unit supplying power to respective power domains in which the first controller and the second controller are arranged when the image forming apparatus is turned on; and
   the method for controlling the image forming apparatus further comprises
   when the image forming apparatus is turned on and the power is supplied, the first controller becoming in a reset release state to perform initialization, setting the access address by controlling the address change unit, transmitting a reset release signal to the second controller, and then operating in the normal state by booting a main program after transmitting the reset release signal to the second controller; and
   the second controller maintaining a reset state until the reset release signal is received after the image forming apparatus is turned on, and when the reset release signal is received, becoming in the reset release state to operate in the normal state.

5. The method for controlling an image forming apparatus as claimed in claim 1, wherein the second controller performing an image forming job in the normal state under the control of the first controller.

6. The method for controlling an image forming apparatus as claimed in claim 5, wherein the control signal is a reset signal which stops the second controller performing the image forming job.

7. An image forming apparatus comprising:
first and second memories; and
a first controller to perform a control operation using the first memory and an image forming job in a normal state; and
a second controller to perform a low-power service in a low-power state,
wherein the first controller copies a low-power service program stored in the first memory into the second memory and transmits a control signal to a second controller when a condition for changing a state from the normal state to the low-power state is satisfied, and
wherein the second controller performs the low-power service by executing the low-power service program copied to the second memory when the control signal is received.

8. The image forming apparatus as claimed in claim 7, further comprising:
an inter-controller communication unit to relay communication between the first controller and the second controller; and
an address change unit setting a memory address to be accessed by the second controller in the low-power state;
wherein the first controller controls the address change unit to set the memory address to be accessed in the second memory, and the second controller performs the lower-power service by executing the low-power service program through accessing of the second memory according to the set memory address when the control signal is received.

9. The image forming apparatus as claimed in claim 8, wherein the first controller and the second controller are arranged in different power domains, and when the low-power service is performed, the second controller cuts off power that is supplied to the power domain in which the first controller is arranged.

10. The image forming apparatus as claimed in claim 9, further comprising a power supply unit to supply power to respective power domains in which the first controller and the second controller are arranged when the image forming apparatus is turned on;
wherein when the image forming apparatus is turned on and the power is supplied, the first controller becomes in a reset release state to perform initialization, sets the access address by controlling the address change unit, transmits a reset release signal to the second controller, and then operates in the normal state by booting a main program, and
the second controller maintains a reset state until the reset release signal is received after the image forming apparatus is turned on, and becomes in the reset release state to operate in the normal state when the reset release signal is received.

11. The image forming apparatus as claimed in claim 7, wherein the second controller performs an image forming job in the normal state under the control of the first controller.

12. The image forming apparatus as claimed in claim 11, wherein the control signal is a reset signal which stops the second controller performing the image forming job.

* * * * *